United States Patent [19]

Fisk

[11] Patent Number: 5,523,372
[45] Date of Patent: Jun. 4, 1996

[54] STARCH GRAFT COPOLYMER FROM PRIME STARCH

[75] Inventor: Donald Fisk, Cuba, Ill.

[73] Assignee: Uni-Star Industries Ltd., Canton, Ill.

[21] Appl. No.: 267,193

[22] Filed: Jun. 29, 1994

[51] Int. Cl.$^6$ ............ C08G 83/00; C08G 85/00; B29C 67/22; C08H 5/00
[52] U.S. Cl. ............ 527/313; 527/314; 521/82; 521/84.1
[58] Field of Search ............ 527/313, 314; 521/82, 84.1, 79

[56] References Cited

U.S. PATENT DOCUMENTS

| | | | |
|---|---|---|---|
| 3,137,592 | 6/1964 | Protzman et al. | 127/71 |
| 3,332,897 | 6/1967 | Ray-Chaudburi | 525/54.3 |
| 3,471,439 | 10/1969 | Bizler | 523/202 |
| 3,740,362 | 6/1973 | Gaylord | 527/312 |
| 3,781,232 | 12/1973 | Gaylord | 527/312 |
| 4,026,849 | 5/1977 | Bagley et al. | 527/312 |
| 4,863,655 | 9/1989 | Lacourse et al. | 264/53 |
| 5,035,930 | 7/1991 | Lacourse et al. | 428/35.6 |
| 5,043,196 | 8/1991 | Lacourse et al. | 428/35.6 |
| 5,095,054 | 6/1992 | Lay et al. | 524/47 |

FOREIGN PATENT DOCUMENTS

WO8302955  9/1983  WIPO .

OTHER PUBLICATIONS

Journal of Applied Polymer Science, vol. 22, (1978) "A New Biodegradable Plastic Made from Starch Graft Poly(methyl Acrylate) Copolymer" pp. 463–464 (Dennenberg et al).

Starch/Starke 45 (1993) Nr. 8.S.276–280—Development of Starch Based Plastics—A Reexamination of Selected Polymer Systems in Historical Perspective (Shogren et al).

Primary Examiner—Nathan M. Nutter
Attorney, Agent, or Firm—Lucas & Just

[57] ABSTRACT

The use of prime starch to make a starch graft copolymer allows the resulting starch graft copolymer to be extruded with reduced torque and pressure as compared to a starch graft copolymer made from conventional dried starch.

15 Claims, No Drawings

STARCH GRAFT COPOLYMER FROM PRIME STARCH

This invention relates to starch graft copolymers and, more particularly, to the use of prime starch for making starch graft copolymers and the use of the starch graft copolymers made from prime starch in extrusion and injection molding operations.

Starch graft copolymers are a class of plastic material and are made from starch and a synthetic polymer. U.S. Pat. No. 4,026,849 teaches making a starch graft copolymer from starch obtained from any number of plant sources and a thermoplastic polymer such as polystyrene, poly(methyl acrylate), poly(butyl acrylate), poly(methyl methacrylate), or a combination thereof. The '849 patent also teaches that starch graft copolymers can be extruded or injection molded.

Prime starch is starch extracted from a starch bearing plant through a wet milling process before the starch has been subjected to a drying process. In a corn wet milling operation, corn kernels are added to water and subjected to a multi-stage process to separate the starch from the gluten, oil and hull. The resulting starch is in an aqueous slurry which is conventionally subjected to a dewatering step and a drying step. The dewatering step is typically a pressure and/or vacuum process while the drying step is typically a hot air process. The term "prime starch" as used in the specification and claims means starch prior to the drying step. The prime starch can be either dewatered or in slurry form. Dewatered prime starch is conventionally referred to as starch cake. Prime starch in either the cake or slurry form is generally not available commercially.

Starch graft copolymers as well as starch itself have recently come into the spotlight due to their biodegradable nature. With mounting pressure on manufacturers to produce biodegradable products, more and more manufacturers are seeking alternative sources for conventional synthetic polymers. Natural polymers such as cellulose and starch have been the main contenders as replacements for the synthetic polymers.

Molding and/or extrusion of plastic materials is a conventional process wherein a solid plastic material is softened under heat and pressure to a molten state and then shaped while in the molten state. The shaped product is then hardened by cooling. For example, injection molding typically employs a single screw extruder to soften the plastic material and force the softened plastic material into a mold wherein it hardens.

It has now been discovered that a shaped article made from a starch graft copolymer using prime starch has greater ductility and flexibility than a shaped article made from a starch graft copolymer using conventional dried starch. It has also been found that less energy is needed to extrude a starch graft copolymer made from prime starch than a starch graft copolymer made from conventional dried starch. These attributes of a shaped article made from a starch graft copolymer of prime starch are obtained without the loss of biodegradability, i.e. a shaped article made from a starch graft copolymer of prime starch has comparable biodegradability to a shaped article made from a starch graft copolymer of conventional dried starch. Furthermore, prime starch graft copolymers produce a molded product with a more uniform product composition than starch graft copolymers made from conventional dried starch.

It is not completely understood why prime starch produces a starch graft copolymer with physical attributes which are markedly different from conventional dried starch. It is speculated that, during drying, closely associated regions are formed within the starch granule and that these regions do not become fully disassociated upon rehydration. These associated regions in the starch granule may cause an obstruction to a uniform reaction with the synthetic monomer during the grafting reaction thereby resulting in the differences between the starch graft copolymer of prime starch and the starch graft copolymer of conventional dried starch. Whatever the reason, the physical differences between the two starch graft copolymers are real and measurable.

In order to make a starch graft copolymer in accordance with the present invention, the moisture level of the prime starch cannot be below about 13.5% by weight and, preferably, is not below about 17% by weight. The moisture level of the prime starch used to make the starch graft copolymer in accordance with the present invention is more preferably about 20% by weight and above.

Any source of prime starch can be employed in the present invention. Suitable sources include maize, sorghum, wheat, potato, barley, tapioca and rice. The preferred sources are maize and wheat.

The prime starch used in the present invention can be either in slurry form or dewatered cake form. In either case, it is preferred that the reaction between the starch and the synthetic polymer take place in an aqueous medium. In fact, one of the novel aspects of the present invention is that a starch graft copolymer can be made without the need for drying the starch. Thus, a step routinely thought to be necessary is eliminated from the overall process for making starch graft copolymers.

Starch graft copolymers are made by grafting a monomer onto the granular starch. Suitable monomers for use in the present invention include styrene, methyl methacrylate, methyl acrylate, butyl acrylate, butadiene, isoprene, and combinations thereof. Preferably, methyl acrylate, butyl acrylate and blends of methyl acrylate and butyl acrylate are used as the monomers.

Many methods are known for the initiation of graft polymerization, e.g., ceric ion, cobalt-60 irradiation, electron beam irradiation, ozone, ferrous ion-peroxide, or other redox systems. Any of these known methods will yield the composite compositions of the instant invention. Good results have been obtained with a ceric ion as the initiator.

When using a ceric ion as an initiator, it has been found that ceric ammonium nitrate is a good source of ceric ion. The ceric ammonium nitrate can be added either in one step or proportionally over a period of time by means of a solution of nitric acid wherein the ceric ammonium nitrate has been dissolved.

The grafting reaction is conducted in a conventional manner using conventional equipment to produce a starch graft copolymer for use in the present invention. A suitable method for making the starch graft copolymer for use in the present invention is to form an aqueous slurry of the granular prime starch to a Baume of about 2 to 30, preferably about 20 Be. The water used to make the slurry is distilled or deionized. In order to remove dissolved oxygen, a nitrogen purge is used for about 30 minutes. Alternatively, some other method, such as a vacuum, is used to remove the oxygen from the water.

During the oxygen removal step, the slurry is heated to about 15° C. to about 55° C. and, more preferably, about 25° C. to about 45° C. The temperature of the slurry throughout the reaction is maintained below the gelatinization temperature of the starch and, generally, below about 60° C.

Next, the monomer is added to the deoxygenated slurry. The purge/vacuum no longer needs to be maintained; however, oxygen should not be introduced into the reaction vessel. The monomer is stirred into the slurry so as to uniformly distribute it throughout the slurry. The amount of monomer added is calculated in a conventional manner so as to provide an add-on level in accordance with the present invention. The add-on level is conventionally about 10% to about 90% by weight and, preferably, about 20% to about 60% by weight.

The pH of the slurry is adjusted to under 2.0 to obtain the maximum grafting efficiency. Good results have been obtained by using nitric acid. The pH adjustment can be done at any time prior to the addition of the initiator. Preferably, the pH of the water is adjusted to below 2.0 prior to the addition of the starch to the water.

Next, an initiator of ceric ammonium nitrate is added in a 1N nitric acid solution over a period of about ½ hour. Good results have been obtained with using a ratio of about one mole of ceric ammonium nitrate to about 50 to about 250 anhydroglucose units (AGU) of starch.

The reaction is allowed to proceed for a period of time to obtain the add-on level of polymer in accordance with the present invention.

Finally, the reaction mixture is neutralized and dewatered and the resulting starch graft copolymer is dried.

In order to increase the grafting efficiency, the monomer is added after the addition of the initiator rather than before. By adding the monomer after the initiator, the grafting efficiency can be increased by as much as about 20%. When adding the monomer after the initiator, there is a limited amount of time from when the initiator is added to when the monomer has to be added. The initiator, and especially ceric ammonium nitrate, is a strong oxidizer and in the acid environment will soon start to break down the starch. The maximum length of time between addition of the initiator and the monomer will vary and can readily be determined by one of skill in the art.

It has been found that the reaction between the prime starch and the monomer can take place in the barrel of an extruder. The preferable extruder type is a co-rotating twin screw extruder with heating/cooling of each zone separately controlled. Sufficient barrel ratio (L/D) is necessary to promote polymerization in the extruder barrel. Starch cake as it is taken from a dewatering step at a starch wet milling plant, is fed into the extruder and is immediately subjected to a vacuum while being mixed in the extruder to remove the oxygen. The initiator in dilute acid is added, mixed briefly but intensively and then the monomer is added and also mixed briefly and intensively. The material is transported down stream in the extruder and at the end of the barrel, a vacuum is used to pull off any unreacted monomer and surplus water vapor. These gases are passed through a scrubber and the monomer reused and the condensed water, being pure, is used to dilute the acid/initiator mix. This water can also serve to help control reaction temperature by controlling water content of the mix. Next the neutralizer is added and intensively mixed and the grafted finished product is expelled from the extruder, sized, and dried. This system cuts costs by reducing steps in the grafting procedure, eliminates the expensive disposition of effluents, reduces potential contaminants from wet milling slurry water and, comparatively, is much safer for the operators.

It has been found that a lower temperature must be employed to dry a starch graft copolymer made from a prime starch. Too high a temperature will cause the starch graft copolymer to gelatinize. Preferably, the drying temperature is about 35° C. to about 40° C.

Using prime starch decreases the amount of water added into the process and shortens the degassing step. In the case of a slurry, the use of additional water can be completely eliminated. Filtration of the grafted prime starch product reveals that the product dries into a finer powder than conventional dried or modified corn starch products after sifting. A different material behavior has been noticed in several processing steps utilizing the prime starch as compared to conventional dried starch: (a) a smoother, more uniform slurry with much less free water is obtained; (b) the filtration requires more pressure to reduce the moisture content; (c) the material tends to gelatinize at a lower temperature while being dried; and (d) compounding formulations require less extruder torque. Additionally, it is believed that the grafted material made with prime starch is a more uniformly grafted material than grafted material made with conventional dried starch. Specifically, it has been found that the grafted material made with prime starch does not stick to the walls of the reaction vessel or the impeller of the reaction vessel as much as the grafted material made with dried starch. These characteristics mean that the starch graft copolymer of the present invention is easier, and thus less costly, to process than a starch graft copolymer made with dried starch.

It has also been found that the starch graft copolymer made with prime starch will convert more easily to a more cohesive molten state. In rare instances, hard-to-remove parts in the mold cavity would break away from the rest of the part and remain in the mold cavity. It has been discovered that the next shot (subsequent filling of the cavity with molten material) results in the remaining portion from the previous cycle adhering to the new shot and, consequently, the entire part is ejected from the mold. In all instances where a starch graft copolymer of conventional dried starch was utilized in the same formulation, and extruded into this same mold, this phenomenon did not occur.

The extrusion and injection molding of the prime starch graft copolymer is done in a conventional manner using conventional equipment. The prime starch grafted copolymer is compounded in a conventional manner using conventional equipment. In one example, a prime starch graft copolymer at a moisture content of about 20% was compounded using a twin screw extruder wherein the barrel was at a temperature of 200° F. (95° C.) and had a length to diameter ratio of 14:1. The extruder was operated at 30 rpm. The prime starch graft copolymer was compounded with about 6 parts of plasticizer and about 0.5 parts of an internal lubricant based on 100 parts by weight prime starch graft copolymer. Compounding of plastic materials is a conventional step in which various additives are combined with the polymeric material so as to form a uniform material suitable for injection molding or other processing by extrusion or other conventional means.

Pellets were produced at the outlet or nozzle of the twin screw extruder and air dried down to about 5% moisture. These pellets are the feed stock to the extruder/injection molding machine. The pellets can be passed through the compound extruder again if they are not uniform.

In order to injection mold the pellets, conventional equipment is used in a conventional manner. In this instance, the injection molding machine had an extrusion barrel operated at 150 rpm at 160° C. with a length to diameter ratio of 24:1. There was a lapse of about 30 seconds between shots to the mold. The mold itself was a single cavity mold. The molded product formed by the cavity was a cereal bowl. Each shot had a residence time in the barrel of about 1 to 2 minutes.

It was noted that the molded product made from the extruder with a starch graft copolymer of prime starch had a smooth homogeneous interior typical of synthetic polymers rather than the non-uniform interior which is typical of extruded products made from starch graft copolymers of conventional dried starch.

These and other aspects of the present invention may be more fully understood by reference to the following examples.

EXAMPLE 1

This example illustrates making a starch graft copolymer from a prime starch in slurry form.

Using a conventional common corn starch slurry as obtained from a wet milling operation prior to dewatering and drying, the solids content of the slurry was adjusted to 20% and the pH of the slurry was adjusted to 2–3 with dilute (1N) nitric acid. The slurry contained 45 pounds of dry starch. The slurry was subjected to a vacuum for 10 minutes to remove oxygen and then the temperature was maintained at 80° F. (27° C.). Next, 36.8 pounds of monomer was added to the slurry. The monomer added was methyl acrylate. Then the initiator, ceric ammonium nitrate, in a 1N nitric acid solution was added at a level of one mole of ceric ammonium nitrate to 100 AGU. The initiator was added over 5 minutes. After a period of about 30 to 40 minutes, sodium hydroxide was added to the system to adjust the pH to neutral. Finally, the reaction product was dewatered and dried.

EXAMPLE 2

This example illustrates the reduced temperature and torque necessary for a starch graft copolymer made from prime starch compared to a starch graft copolymer made with conventional dried corn starch.

A starch graft copolymer made from prime common corn starch in accordance with Example 1 was compared to a starch graft copolymer made from conventional dried common corn starch. The results of this test are listed below:

|  | Prime 50:50 | Dried 50:50 | Prime 59:41 Starch:M.A. | Dried 59:41 |
| --- | --- | --- | --- | --- |
| Moisture (%) | 10.2 | 10.2 | 16 | 18 |
| Torque (M-g) | 5464.6 | 8174 | 4287.2 | 5455 |
| Pressure (psi) | 5576.6 | 6877.5 | 4527.7 | 5049.8 |

The add-on levels are listed at the top of the column as a ratio of the weight percent of starch to synthetic polymer.

These materials were extruded at a moisture level of 5–6%. The extruder had a barrel length to diameter ratio of 11:1 and used a twin screw extruder operated at 30 rpm. The temperature along the length of the barrel was 190° F. (88°C.) at entry, 210° F. (99° C.), 220° F. (104° C.) and 230° F. (110° C.) at exit.

EXAMPLE 3

This example compares various physical attributes of a starch graft copolymer made in accordance with the present invention with a starch graft copolymer made with conventional dried starch.

Starch graft copolymers made from prime starch and a methyl acrylate monomer were prepared in accordance with Example 1 above to produce add-on levels of 41%, 50% and 59%.

Three starch graft copolymers made from conventional, dried starch and methyl acrylate were prepared using the procedure in Example 1 above and having add-on levels of 41%, 50% and 59%.

Each of the starch graft copolymers were tested for Young's modulus, tensile strength, elongation and tear resistance. The test results are given below:

|  | Young's Modulus | Tensile Strength (MPa) | Elongation (%) | Tear Strength (N/mm) |
| --- | --- | --- | --- | --- |
| Prime Starch |  |  |  |  |
| 41% | 212.8 | 11.05 | 54.75 | 2.030 |
| 50% | 189.6 | 10.84 | 62.54 | 3.833 |
| 59% | 191.8 | 10.82 | 69.25 | 4.289 |
| Conventional Dried Starch |  |  |  |  |
| 41% | 356.7 | 14.08 | 15.85 | 1.719 |
| 50% | 235.4 | 15.03 | 51.33 | 3.591 |
| 59% | 270.5 | 13.33 | 28.56 | 3.242 |

The flexibility or brittleness was determined by Young's Modulus test.

The tensile strength was determined by using two inch gauge length samples with a 50 mm/min. crosshead speed.

The elongation was determined by the Trouser test, again on a two inch gauge length. The Young's Modulus test, Trouser test, and tensile strength test were done in a conventional manner using conventional equipment.

The samples of both the prime starch graft copolymer and the conventional dried starch graft copolymer were prepared by extruding the copolymers in a single screw extruder under the following conditions: the moisture levels were at 16% for the 41% add-on formulation, 10% for the 50% add-on formulation, and 16% for the 59% add-on formulation; the barrel length to diameter ratio was 20:1; the entry temperature was 88° C.; the exit temperature was 106° C.; and the speed was at 30 rpm. For the 50% add-on level, a ribbon measuring about 1"×4" was used for the test. For the 59% add-on level, a ribbon measuring about 1.1"×4" was used; and for the 41% add-on level, the ribbon measured 1.6"×4".

As can be seen, the ductility and tear strength of the prime starch graft copolymer was superior to that of the conventional dried starch graft copolymer.

This example also illustrates that a prime starch graft copolymer with a higher percentage of starch, i.e. a lower add-on level, has the same physical properties as a conventional dried starch graft copolymer with less starch, i.e. with a higher add-on level. This means that using prime starch produces a product which is more biodegradable than the starch graft copolymer made from conventional dried starch.

As can be seen from the above data, the starch graft copolymer made with conventional dried starch at 50% and 59% starch levels had a dramatic decrease in properties when compared with starch graft copolymer made with identical starch levels of prime starch. In fact, an increase in tear strength was observed in the higher starch level (59%) graft copolymer ribbon made with prime starch, while the opposite is true with the dried starch material.

EXAMPLE 4

This example illustrates the melt flow index of a starch graft copolymer made from prime starch as compared to a starch graft copolymer made from conventional dried starch.

In accordance with Example 1 above, a prime starch graft copolymer was made with a methyl acrylate monomer to an add-on level of 45%. The melt flow of these materials as well as a conventional polyethylene were as follows:

|  | Melt Flow |
| --- | --- |
| Polyethylene Index Rating of 100 | 12 inches |
| Prime Starch Graft Copolymer | 13 inches |
| Conventional Dried Starch Graft Copolymer | 11 inches |

The melt flow index was measured by injection molded spiral melt flow test.

These data evidence the fact that the starch graft copolymer made from prime starch has flow characteristics comparable to conventional synthetic polymers.

It will be understood that the claims are intended to cover all changes and modifications of the preferred embodiments of the invention herein chosen for the purpose of illustration which do not constitute a departure from the spirit and scope of the invention.

What is claimed is:

1. In a process for making a starch graft copolymer, wherein monomers are grafted onto a starch substrate to form grafted chains of thermoplastic polymer segments, the improvement comprising grafting said monomers onto a prime starch substrate.

2. The process of claim 1 wherein the prime starch substrate is selected from the group consisting of maize, sorghum, wheat, potato, barley, tapioca and rice.

3. The process of claim 2 wherein the monomers are grafted to the prime starch substrate in an amount of about 10% to about 90% by weight.

4. The process of claim 1, 2, or 3, wherein the monomers are selected from the group consisting of styrene, methyl acrylate, butyl acrylate, butadiene, isoprene and combinations thereof.

5. A process for preparing a plastic article by extruding a starch graft copolymer, the improvement comprising extruding a starch graft copolymer made with a prime starch substrate.

6. The process of claim 4 wherein the prime starch substrate is selected from the group consisting of maize, sorghum, wheat, potato, barley, tapioca and rice.

7. The process of claim 5 or 6 wherein the starch graft copolymer is made from a monomer selected from the group consisting of styrene, methyl acrylate, butyl acrylate, butadiene, isoprene and combinations thereof.

8. A starch graft copolymer comprising a prime starch substrate onto which has been grafted monomers to form grafted chains of thermoplastic polymer segments.

9. The copolymer of claim 8 wherein the prime starch substrate is selected from the group consisting of maize, sorghum, wheat, potato, barley, tapioca and rice.

10. The copolymer of claim 9 wherein the monomers are grafted to the prime starch substrate in an amount of about 10% to about 90% by weight.

11. The copolymer of claim 8, 9 or 10 wherein the monomers are selected from the group consisting of styrene, methyl acrylate, butyl acrylate, butadiene, isoprene and combinations thereof.

12. The process of claim 1 wherein the prime starch substrate is selected from the group consisting of maize and wheat starch;

the monomer is selected from the group consisting of methyl acrylate, butyl acrylate, and blends of methyl acrylate and butyl acrylate; and the monomers are grafted onto the prime starch substrate in an amount of about 20% to about 60% by weight.

13. The starch graft copolymer of claim 7 wherein the prime starch substrate is selected from the group consisting of maize and wheat starch;

the monomer is selected from the group consisting of methyl acrylate, butyl acrylate, and blends of methyl acrylate and butyl acrylate; and the monomers are grafted onto the prime starch substrate in an amount of about 20% to about 60% by weight.

14. The process of claim 12 wherein the prime starch substrate has a moisture level of about 20% or more during the grafting step.

15. The process of claim 12 wherein the grafting step is conducted in an extruder.

\* \* \* \* \*